United States Patent [19]

Schneider et al.

[11] Patent Number: 4,549,266
[45] Date of Patent: Oct. 22, 1985

[54] VEHICLE SPEED CONTROL

[75] Inventors: Jack H. Schneider, Taylor; Gary D. Huber, Dearborn, both of Mich.

[73] Assignee: Ford Motor Company, Dearborn, Mich.

[21] Appl. No.: 555,263

[22] Filed: Nov. 25, 1983

[51] Int. Cl.⁴ .............................................. B60K 31/00
[52] U.S. Cl. ................................ 364/426; 364/431.07; 180/179; 123/359
[58] Field of Search .......... 364/424, 426, 565, 431.07; 123/342, 360, 352, 340, 341, 351, 359; 180/170, 178, 179; 340/650, 644, 664; 361/152

[56] References Cited

U.S. PATENT DOCUMENTS

| 3,804,193 | 4/1974 | Ikuta | 180/170 |
| 4,120,373 | 10/1978 | Fleischer | 180/179 |
| 4,138,723 | 2/1979 | Nehmer et al. | 364/424 |
| 4,140,202 | 2/1979 | Noddings et al. | 364/426 |
| 4,150,654 | 4/1979 | Heitzman et al. | 123/359 |
| 4,325,336 | 4/1982 | Kuno et al. | 180/179 |
| 4,367,804 | 1/1983 | Sakakibara | 123/360 |
| 4,434,469 | 2/1984 | Suzuki et al. | 364/426 |

Primary Examiner—Gary Chin
Attorney, Agent, or Firm—Peter Abolins; Robert D. Sanborn

[57] ABSTRACT

An automotive speed control system uses logic activated switches on both sides of solenoids controlling vent and vacuum valves. A vacuum solenoid is activated upon the simultaneous occurrence of an activation of a vent valve solenoid, an activation of the speed control system, and a determination that solenoid current is below a desired magnitude.

2 Claims, 5 Drawing Figures

Four States Of Speed Control Actuator

| State Number | Vacuum | | Vent | | Actuator Chamber Pressure | Throttle Position |
|---|---|---|---|---|---|---|
| | Solenoid | Valve | Solenoid | Valve | | |
| 1 | Off | Closed | Off | Open | Atmospheric Pressure | Closed Throttle |
| 2 | Off | Closed | Energized | Closed | Fixed At Pressure Before This State | Fixed At Position Before This State |
| 3 | Energized | Open | Off | Open | Vacuum Vented To Atmosphere | Indeterminate |
| 4 | Energized | Open | Energized | Closed | Vacuum Pressure | Open Throttle |

FIG. 2.

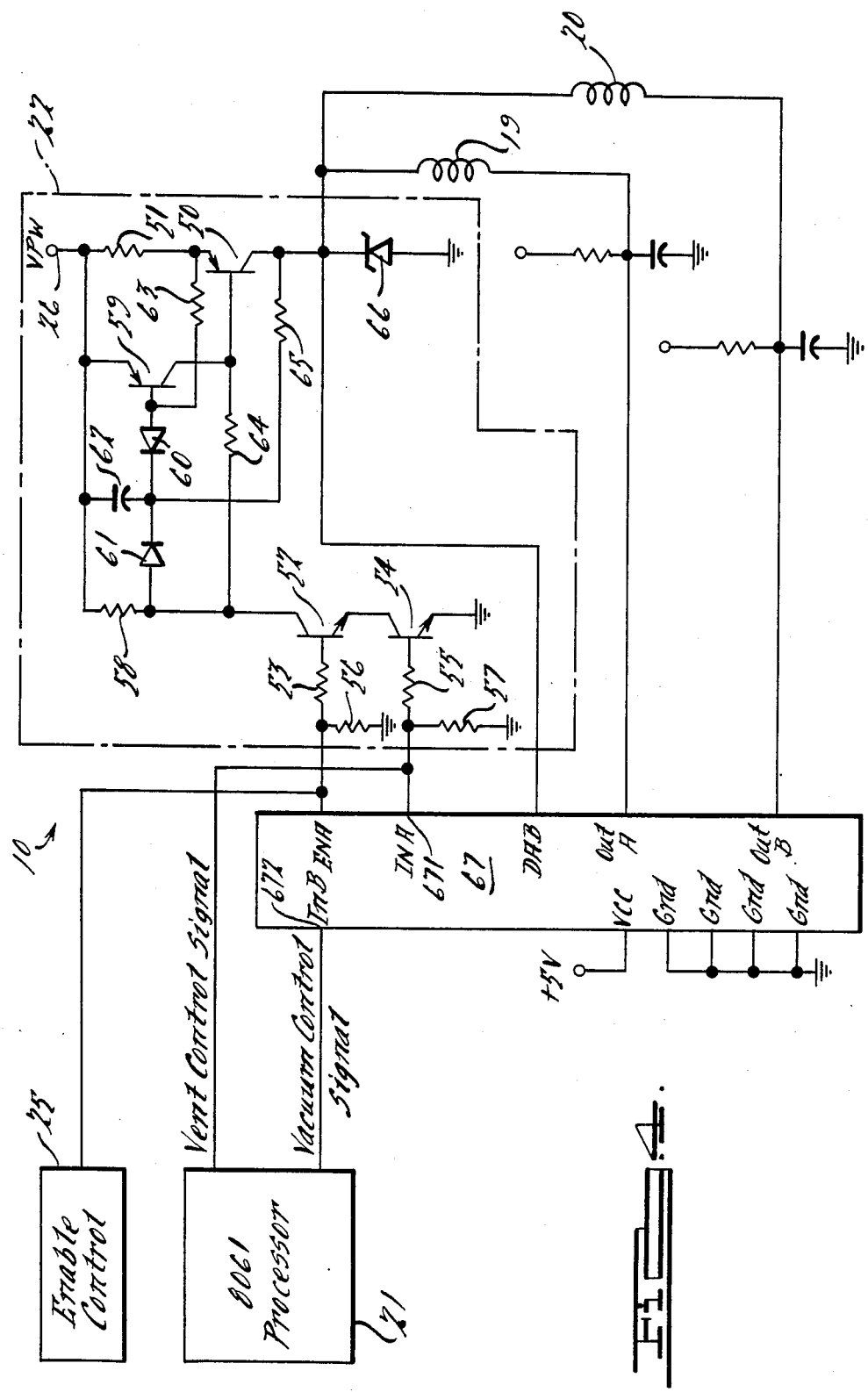

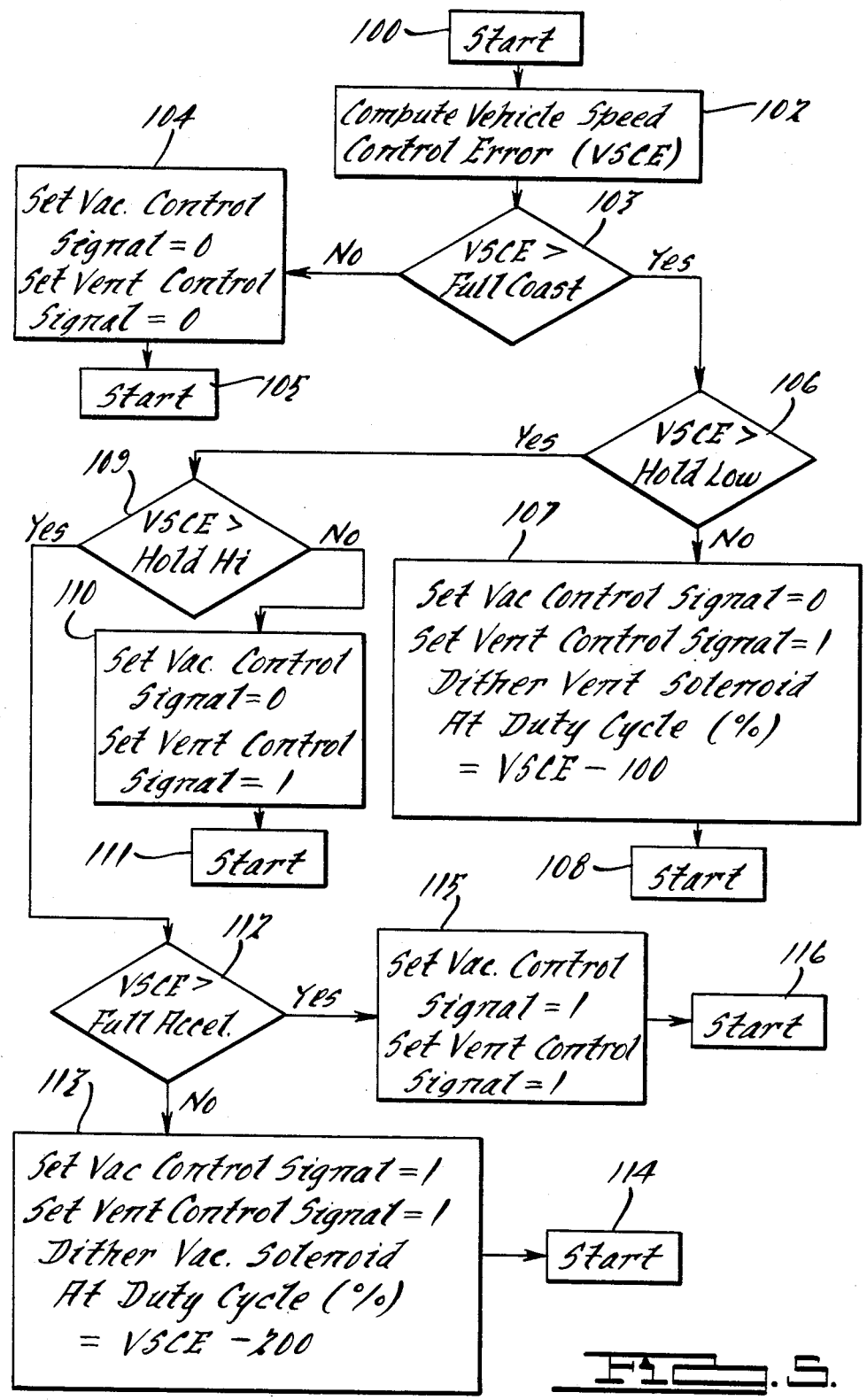

VEHICLE SPEED CONTROL

BACKGROUND OF THE INVENTION

1. Technical Field

This invention relates to motor vehicle speed control systems.

2. Prior Art

There are known many apparatuses for a motor vehicle speed control. For example, U.S. Pat. No. 3,804,193 issued to Ikuta teaches an automatic constant speed control system for vehicles. U.S. Pat. No. 4,138,723 issued to Nehmer et al teaches a motor vehicle speed control system which is microprocessor-based.

Some such speed control systems use electrical solenoids to activate the application of a vacuum to or the venting of the vacuum from a pressure reservoir, or actuator chamber, in order to move a diaphragm mechanically coupled to the throttle. Typically, such a solenoid is coupled in series with a switch to control activation of the solenoid. However, the operation of the switch can be thwarted by shorting various portions of the circuit directly to ground potential or to a battery potential.

In some known speed control systems, battery voltage is applied to the solenoids controlling the vacuum valves and the vent valves at all times. This means that a short to ground in the electrical lines going to the vacuum and vent solenoids would activate the actuator chamber even if the speed control module were turned off. In fact, a short in both the lines to the vacuum and vent solenoids at the same time would cause the speed control actuator chamber to go to a state where the vacuum solenoid is energized causing the vacuum valve to be open and the vent solenoid is energized causing the vent valve to be closed. As a result, the actuator chamber pressure is at a vacuum pressure and the throttle is pulled to an open throttle position, an undesired condition when the speed control module is turned off. These are some of the problems this invention overcomes.

SUMMARY OF THE INVENTION

This invention includes an apparatus and method for controlling a vent valve solenoid and a vacuum valve solenoid actuating an automobile throttle by the successive application of atmospheric pressure and a vacuum to an actuator chamber of an automotive speed control device. The apparatus includes a first switch means, a second switch means, and a third switch means. The first switch means is coupled between a voltage source and a common node of a first terminal of the vent valve solenoid and a first terminal of the vacuum valve solenoid for selectively applying voltage to both the vacuum valve solenoid and the vent valve solenoid. The second switch means is coupled between a second terminal of the vent valve solenoid and a ground potential. The third switch means is coupled between a second terminal of the vacuum valve solenoid and a ground potential.

The first switch means includes a first logic means for permitting a closed path between the voltage source and the vent and vacuum solenoids only upon the simultaneous occurrence of the following three conditions: (1) an indication of a desired actuation of the vent valve solenoid thereby closing the vent valve and establishing a vacuum in the actuator chamber upon activation of the vacuum valve solenoid, (2) an indication of a desired activation of the speed control device and (3) a determination that current flow between the common node and the first switch means is below a desired magnitude.

BRIEF DESCRIPTION OF THE DRAWINGS

FIG. 2 is a table showing the possible states of the vacuum and vent solenoid and valve and the corresponding actuator chamber pressure and throttle positions;

FIG. 4 is a schematic and block diagram of a speed control system in accordance with an embodiment of this invention; and FIG. 5 is a logic flow diagram showing the determination of the condition (i.e. on or off) of the vent and vacuum control signals when the speed control is activated.

DETAILED DESCRIPTION OF THE INVENTION

Figure 1:
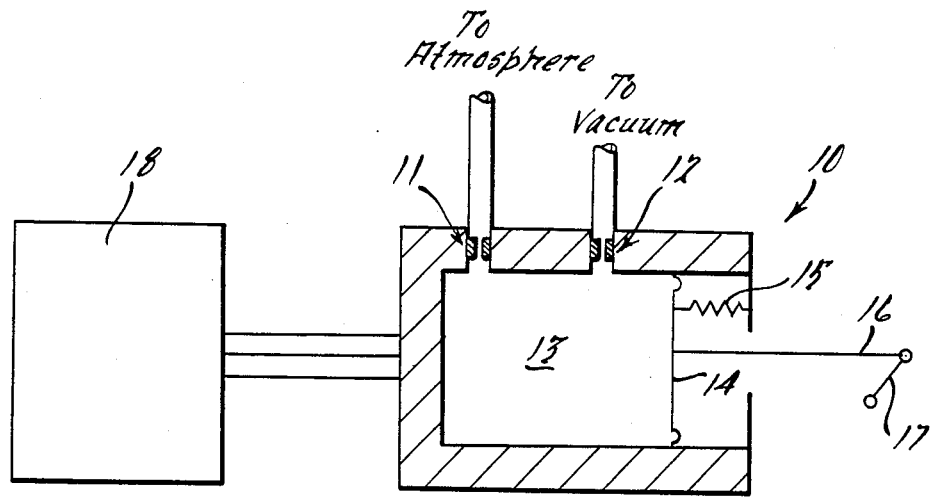
FIG. 1 is a schematic block diagram of a speed control actuator chamber coupled mechanically to a throttle linkage and electrically to an electronic engine control module.

Referring to FIG. 1, a speed control system 10 includes a vent valve 11 and a vacuum valve 12 coupled to an actuator chamber 13. Vent valve 11 controls communication between actuator chamber 13 and the atmosphere. Vacuum valve 12 controls communication between the actuator chamber 13 and a vacuum source in the vehicle. A diaphragm 14 is coupled by a return spring 15 to a wall of actuator chamber 13. Movement of diaphragm 14 causes movement of throttle linkage 16 and throttle 17. Solenoids governing actuation of vent valve 11 and vacuum valve 12 are electrically coupled to a speed control module 18.

Figure 3:
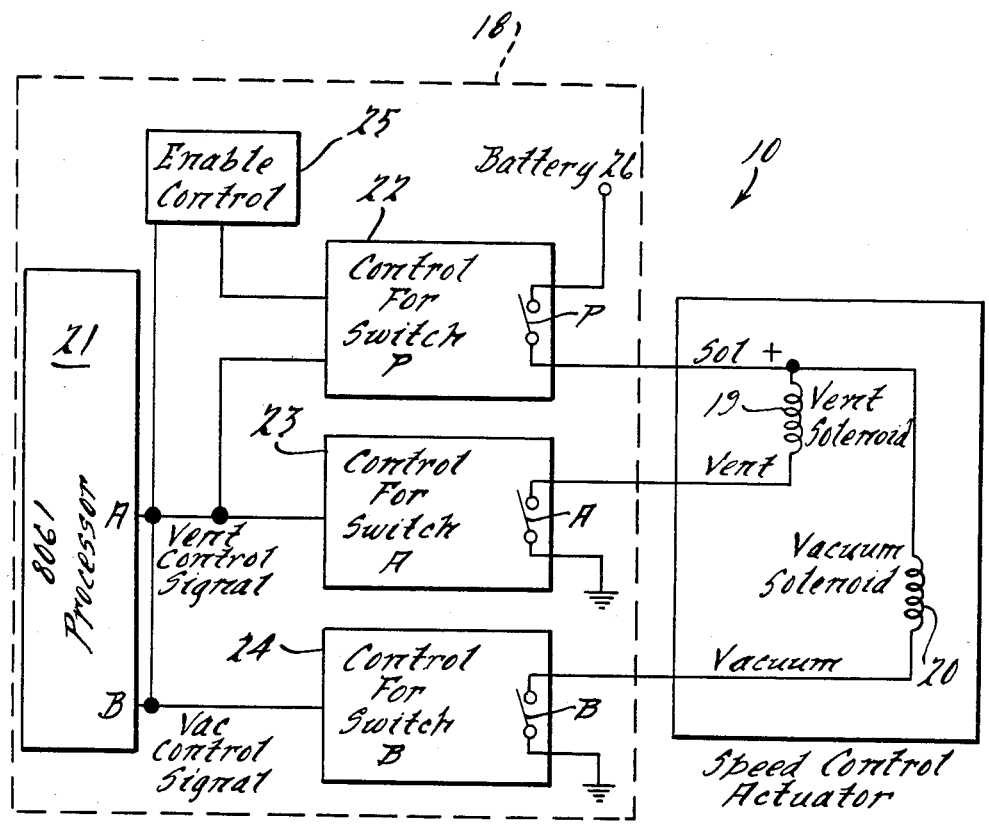
FIG. 3 is a block diagram of the coupling of the electronic engine control module to the vacuum and vent solenoid through three switches which include logic.

Referring to FIG. 3, the electrical connection between speed control module 18 and a vent solenoid 19 and a vacuum solenoid 20 is shown in more detail. A microprocessor 21 is coupled to a control 22 for a switch P, a control 23 for a switch A, and a control 24 for a switch B. Controls 22, 23 and 24 also receive an input from an enable control 25, which applies an enable control signal. The enable control signal has a high logic state indicating desired actuation of the speed control system and low logic state indicating a desired nonactuation of the speed control system. Switch P is coupled between a battery 26 and a common node of vent solenoid 19 and vacuum solenoid 20. Switch A is coupled between a ground potential and the side of vent solenoid 19 opposite from battery 26. Analogously, switch B is coupled between a ground potential and the opposite side of vacuum solenoid 20 from battery 26. Control 22 for switch P closes switch P when both the enable control signal and the vent control signal are a logic high. If either or both the enable and the vent control signals are a logic low, switch P is open.

Referring to FIG. 2, the states of a vacuum and vent solenoid and valve and the corresponding actuator chamber pressure and throttle position are listed as State Nos. 1, 2, 3 and 4. In State 1, vacuum solenoid 20 and vent solenoid 19 are off so that vacuum valve 12 is closed and vent valve 11 is open. As a result, actuator chamber pressure is at atmospheric pressure and the throttle position is at a closed throttle. In State 2, vacuum solenoid 20 is off which corresponds to a closed vacuum valve 12. Also, in State 2, vent solenoid 19 is energized which corresponds to a vent valve 22 that is closed. Since both vent valve 11 and vacuum valve 12 are closed, actuator chamber 13 is isolated and the pressure within is fixed at the pressure before the state occurred. Similarly, the throttle position is fixed at the position before this state occurs. In State 3, vacuum solenoid 20 is energized so that vacuum valve 12 is open. Vent solenoid 19 is off so that vent valve 11 is open. The pressure within actuator chamber 13 is such that the vacuum is vented to atmosphere. The throttle position as a result of this venting is indeterminate. This is an undesirable situation because of the loss of the vacuum generated by the vehicle. In State 4, vacuum solenoid 20 is energized so that vacuum valve 12 is open. Vent solenoid 19 is energized so that vent valve 11 is closed. The pressure within acutator chamber 13 is at the vacuum pressure which causes diaphragm 14 to move in and open the throttle.

Referring to FIG. 4, the schematic drawing of speed control 10 includes the components of control 22 for a switch P. Switch P corresponds to a transistor 50 having an emitter connected to battery 26 and a collector connected to one side of solenoid 19. A resistor 51 is connected between the emitter of transistor 50 and battery 26. Two inputs are applied to control 22 by applying a signal to the base of a transistor 52 through a resistor 53 and to a transistor 54 through a resistor 55. In effect, the logic states of the enable control signal and the vent control signal govern the conductive state of transistors 52 and 54.

In the connection of the schematic of FIG. 4, the emitter of transistor 52 is connected to the collector of transistor 54 and the emitter of transistor 54 is grounded. A resistor 56 is connected from resistor 53 to ground and a resistor 57 is connected from resistor 55 to ground. A resistor 58 is connected between the collector of transistor 52 and battery 26. A transistor 59 has an emitter connected to battery 26 and a collector connected to the base of transistor 50. The base of transistor 59 is connected through the series combination of opposing diodes 60 and 61 to the collector of transistor 52. A capacitor 62 is connected between battery 26 and a node intermediate diodes 60 and 61. The base of transistor 59 is connected through a resistor 63 to the emitter of transistor 50. The base of transistor 50 is connected through a resistor 64 to collector of transistor 52. A resistor 65 is connected between the collector of transistor 50 to a node intermediate diode 60 and 61. A zener diode 66 is connected between the collector of transistor 50 and ground.

Collector of transistor 50 is connected to one side of solenoids 19 and 20. The other side of solenoid 19 is connected to an output A of a quad solenoid driver 67. The other side of vacuum solenoid 20 is connected to an output B of quad solenoid driver 67 also. Quad solenoid driver 67 includes controls 23 and 24 and switches A and B of FIG. 3. Vehicle speed control system 10 provides a redundancy for operation of vent solenoid 19 and vacuum solenoid 20 so as to reduce the effects of shorting and other undesirable circuit connections within system 10. The vent control signal applied to control 23 in FIG. 3 is coupled to input 671 of quad driver 67 in FIG. 4. The vacuum control signal applied to control 24 in FIG. 3 is coupled to input 672 of quad driver 67 in FIG. 4. When the vent control signal is high, or a binary 1, switch A is closed and when the vent control signal is low, or a binary 0, switch A is open. Similarly, when the vacuum control signal is high, or a binary 1, switch B is closed and when the vacuum control signal is low, or a binary 0, switch B is open. In general, the vent and vacuum control signals are functions of the activation of the speed control system, including desired vehicle speed, actual vehicle speed, the application of the vehicle brake and the position of the vehicle throttle.

More specifically, referring to FIG. 5, a flow chart indicates the status of the vent and vacuum control signals based on the vehicle speed control error. The vent and vacuum control signals themselves are generated by processor 21 and are a function of signals indicating vehicle brake application, vehicle throttle position, actual vehicle speed, desired vehicle speed and driver actuation of the speed control system. For ease of implementing this logic flow, a bias is added to the vehicle speed control error so that when the error is equal to the magnitude of the bias, the desired action is to hold vehicle speed constant. When the vehicle speed control error is less than the magnitude of the bias, indicating a higher actual vehicle speed than desired, the desired action is to coast to reduce actual vehicle speed. When the vehicle speed control error is more than the magnitude of the bias, indicating a lower actual vehicle speed than desired, the desired action is to accelerate to increase actual vehicle speed. For example, if the actual vehicle speed is too slow, and slower than a function of a constant termed full acceleration, open throttle is applied to the vehicle's engine. If the actual vehicle speed is faster than a function of the full acceleration constant, but slower than a hold high constant, open throttle is applied, but the vacuum solenoid is dithered to control the rate of diaphragm movement and to provide smoother acceleration. If the actual vehicle speed is within a range of vehicle speeds including the desired vehicle speed and between a function of the hold high constant and a function of a hold low constant, the vehicle throttle is maintained at the previous position. If the actual vehicle speed is faster than a function of the hold low constant and slower than a full coast constant, the vehicle throttle is closed and the vent solenoid is dithered so that a smooth coast is achieved. Finally, if the actual vehicle speed is greater than a function of the full coast constant, closed throttle is applied to the vehicle.

Block 100 starts the determination of vent and vacuum control signal states. Block 102 computes the vehicle speed control error, VSCE, in accordance with the formula:

$$VSCE = DCBIAS + [(SETGN)(DVS)] - [(VEHGN)(AVS)] - [(TAPGN)(ATP)]$$

wherein
  DVS is desired vehicle speed
  AVS is actual vehicle speed
  ATP is actual throttle position
and wherein the following constant terms are defined as:
  DCBIAS—DC correction factor
  SETGN—proportional gain of the desired vehicle speed
  VEHGN—proportional gain of the actual vehicle speed TAPGN—proportional gain of the actual throttle position Continuing with the logic flow in FIG. 5, after the vehicle speed control error is computed in block 3, the vehicle speed control error is compared to a constant, full coast, in block 103. If the vehicle control error is less than or equal to the magnitude of the constant full coast, the logic goes to block 104 wherein the vacuum and the vent control signals are both set to 0 indicating that switches A and B are open and that solenoids 19 and 20 are off. This corresponds to State 1 of FIG. 2 and provides for a closed throttle and coasting of the vehicle. After the vacuum and vent control signals are set in block 104, logic proceeds to a block 105 wherein the logic flow returns to start and the vehicle speed control error can be computed again. If the vehicle speed control error is greater than the magnitude of the constant full coast, the logic goes to a block 106 wherein the vehicle speed control error is compared to the magnitude of a hold low constant. If the vehicle speed control error is less than or equal to the magnitude of the hold low constant, the logic flow proceeds to a block 107 wherein the vacuum control signal was set to 0 and the vent control signal is set to 1. Thus, the vacuum solenoid is off and the vacuum valve is closed and the vent solenoid is energized and the vent valve is closed. This corresponds to State 2 wherein the actuator chamber pressure is fixed at the pressure before the state. However, the vent solenoid is dithered at a duty cycle equal to the vehicle speed control error minus 100 in percent. As a result, the actuator chamber pressure is reduced toward atmospheric pressure. The dithering is done to control the rate of movement of diaphragm 14 adjacent actuator chamber 13. Controlling movement of diaphragm 14 controls the acutation of throttle 17 so that vehicle speed changes are smooth.

After the vacuum and vent control signals are set in block 107, the logic flow proceeds to a block 108 wherein it returns to start. If, in clock 106, the vehicle speed control error is greater than the magnitude of the constant hold low, logic flow proceeds to a block 109 wherein the vehicle speed control error is compared to the magnitude of a constant hold high. If the vehicle speed control error is less than or equal to the magnitude of the constant hold high, logic flow proceeds to a block 110 wherein the vacuum control signal is set to 0 and the vent control signal is set to 1. This corresponds to State 2 and the throttle position is fixed at the position before the state and the actuator chamber pressure is fixed at the pressure before the state. This is similar to the state of the control signals as established in block 107 except that the vent solenoid is not dithered. From block 110, the logic flow goes to start at block 111.

If, in block 109 the vehicle speed control error is greater than the magnitude of the constant hold high, logic flow proceeds to a block 112 wherein the vehicle speed control error is compared to the magnitude of a full acceleration constant. If the vehicle speed control error is less than or equal to the magnitude of the full acceleration constant, logic flow proceeds to a block 113 wherein the vacuum control signal is set to 1, and the vent control signal is set to 1. This corresponds to State 4 and tends to establish actuator chamber pressure at vacuum pressure throttle position at open throttle. However, the vacuum solenoid is dithered at a duty cycle, in percent, equal to the vehicle speed control error less 200. By dithering the vacuum solenoid, actuator chamber pressure approaches vacuum pressure more gradually and causes the movement of diaphragm 14 to be relatively smooth. Logic flow from block 113 proceeds to a start block at 114.

If, in block 112, the vehicle speed control error is greater than the full acceleration constant, logic flow proceeds to a block 115 wherein the vacuum control signal and the vent control signal are both set to 1. This corresponds to a State 4 wherein there is open throttle acceleration. The logic flow proceeds to a block 116 from block 115 and returns to start.

In operation, referring to FIG. 3, the circuitry within control 22 for switch P applied power to vent solenoid 19 and vacuum solenoid 20 only if the following three conditions are met:

(1) The vent control signal is in an ON, or logic 1, state which means that switch A is closed. This provides a ground path for vent solenoid 19 and therefore no venting when solenoid 19 is energized.

(2) The enable control is in an ON state which means enable control 25 provides a signal indicating that it is desired that speed control system 10 be turned on.

(3) The connection between switch P and the common node of vent solenoid 19 and vacuum solenoid 20 is not shorted or drawing excessive current as determined by resistor 65 (FIG. 4) sensing the current in the collector of transistor 50.

As a result, first, the logic within controls 22, 23 and 24 provides protection from shorts to ground in the connection between switch P and vent solenoid 19 and vacuum solenoid 20, known as the SOL line. A short to ground in the SOL line will disable the control circuitry for switch P. This protects system 10 from excessive current that may otherwise damage the circuitry. Actuator chamber 13 is put into State 1 if SOL line is shorted to ground thereby turning off both solenoids 19 and 20.

Second, there is protection from shorts to ground in the electrical lines coupling switch A to vent solenoid 19 and coupling switch B to vacuum solenoid 20. With the use of the switch P between battery 26 and vent solenoid 19 and vacuum solenoid 20, a short to ground in the electrical connection between control 23 and vent solenoid 19 or between control 24 and vacuum solenoid 20 will have little or no effect on the operation of speed control system 10. The pressure within actuator chamber 13 will cycle among States 1, 2 and 4 with the short to ground in the line to vent solenoid 19. The actuator will cycle between States 1 and 4 with the short to ground in the line between control 24 and vacuum solenoid 20 or a short to ground in both lines from controls 23 and 24 to vacuum solenoid 20 and vent solenoid 19.

Third, the above logic provides protection from venting the vacuum source to the atmosphere. Switch P control 22 will not provide power to vent solenoid 19 and vacuum solenoid 20 unless processor 21 gives the signal to energize solenoid 19 which would close vent valve 11. This protects the actuator chamber 13 from going to State 3. This keeps the actuator chamber 13 from venting the manifold vacuum to atmosphere and causing an indeterminate state of the throttle.

Fourth, the above logic provides protection from overvoltage and processor failure. The enable control 25 circuitry turns solenoids 19 and 20 off in case of failure within processor 21 or in case of an overvoltage condition applied to controls 23 or 24.

Various modifications and variations will no doubt occur to those skilled in the various arts to which this invention pertains. For example, the particular implementation of the logic control for the switches in the speed control system may be varied from that disclosed herein. These and all other variations which basically rely on the teachings through which this disclosure has advanced the art are properly considered within the scope of this invention.

We claim:

1. An apparatus for controlling a vent valve solenoid and a vacuum valve solenoid actuating an automobile throttle by the application of a pressure vent and a vacuum source to an actuator chamber of an automotive speed control device, said automotive speed control device including means generating a vent control signal having a first logic state indicating desired energization of the vent solenoid and a second logic state indicating a desired off condition of the vent solenoid, generating a vacuum control signal having a first logic state indicating desired energization of the vacuum solenoid and a second logic state indicating a desired off condition of the vacuum solenoid, and generating an enable control signal having a first logic state indicating desired activation of the speed control device and a second logic state indicating a desired nonactivation of the speed control device, said apparatus including:

a first switch means coupled between a voltage source and a common node of a first terminal of the vent valve solenoid and a first terminal of the vacuum valve solenoid for selectively applying voltage to both the vacuum valve solenoid and the vent valve solenoid;

a second switch means coupled between a second terminal of the vent valve solenoid and a ground potential;

a third switch means coupled between a second terminal of the vacuum valve solenoid and a ground potential;

said first switch means including a first logic means for permitting a closed path between the voltage source and the vent and vacuum solenoids only upon the simultaneous occurrence of the three conditions of: (1) an indication by the vent control signal of a desired actuation of the vent valve solenoid, thereby closing the vent valve and establishing a vacuum in the actuator chamber upon activation of the vacuum valve solenoid, (2) an indication by the enable control signal of a desired activation of the speed control device and (3) determination that current flow between said common node and said first switch means is below a desired magnitude;

said second switch means including a second logic means for permitting a closed path between the vent valve solenoid and the ground potential only upon the occurrence of a vent control signal in a first logic state indicating that vent valve solenoid actuation is desired;

said third switch means including a third logic means for permitting a closed path between the vacuum valve solenoid and the ground potential only upon the occurrence of a vacuum control signal in a first logic state indicating that vacuum valve solenoid actuation is desired;

said first switch means including a first transistor having an emitter collector circuit connected between said common node and the voltage source, and having a base coupled to said first logic means;

said first logic means having inputs adapted to receive the vent control signal and the enable control signal and, in response to the vent and enable control signals, providing a low resistance path between the ground potential and the base of said first transistor;

said first logic means including a current detection means for sensing the current at the common node and applying a voltage to the base of said first transistor; and said first logic means including a second transistor means having an emitter collector circuit coupled between the base of said first transistor means and the voltage source, a pair of opposing diodes coupled between the base of said second transistor means and an electrical node for receiving a signal which is a function of the vent and enable control signals, a capacitor coupled between a node between said opposing diodes and the emitter of said second transistor means, a third transistor means having collector means coupled to said opposing diodes and a base means to receive a function of the enable control signal, a first resistor coupled between the emitter of said second transistor means and said collector means of said third transistor means, a second resistor coupled between the collector of said second transistor means and the collector means of said third transistor means, a third resistor coupled between the base of said second transistor means and the emitter of said first transistor means, a fourth resistor coupled between the emitter of said first transistor means and the voltage source, and a fourth transistor means having collector means coupled to the emitter of said third transistor means, emitter means coupled to the ground potential and base means to receive a function of the vent control signal.

2. A method for controlling a vent valve solenoid and a vacuum valve solenoid in an automotive speed control, the automotive speed control generating a vent control signal having a first logic state indicating desired energization of the vent solenoid and a second logic state indicating a desired off condition of the vent solenoid, generating a vacuum control signal having a first logic state indicating desired energization of the vacuum solenoid and a second logic state indicating a desired off condition of the vacuum solenoid, and generating an enable control signal having a fist logic state indicating desired activation of the speed control device and a second logic state indicating a desired nonactivation of the speed control device, said method including the steps of:

coupling the vent valve solenoid and the vacuum valve solenoid to a voltage source upon the simultaneous occurrence of the three conditions of (1) an indication by the vent control signal of a desired actuation of the vent valve solenoid (2) an indication by the enable control signal of actuation of the speed control device and (3) a determination that current flow between the voltage source and the vent and vacuum valve solenoids is below a desired magnitude;

coupling the vent valve solenoid to a ground potential upon the occurrence of a vent control signal indicating that vent valve solenoid actuation is desired; and coupling the vacuum valve solenoid to a ground potential upon the occurrence of a vacuum control signal indicating that vacuum valve solenoid actuation is desired; and wherein said step of coupling the vent and vacuum valve solenoids to the voltage source including:

coupling the emitter-collector circuit of a transistor between the voltage source and the vent and vacuum valve solenoids; and applying current to the base of the transistor in response to said vent and enable control signals and to the current level in said emitter-collector circuit; and wherein said step of coupling the vent and vacuum valve solenoids to the voltage source further including:

coupling an emitter collector circuit of a second transistor means between the base of said first transistor means and the voltage source;

coupling a pair of opposing diodes to the base of said second transistor;

coupling a collector means of an emitter collector circuit of a third transistor means to said pair of opposing diodes;

coupling a capacitor between a node between said opposing diodes and the emitter of said second transistor means;

coupling a first resistor between the emitter of said second transistor means and said collector means of said third transistor means, coupling a second resistor between the collector of said second transistor means and the collector means of said third transistor means;

coupling a third resistor between the base of said second transistor means and the emitter of said first transistor means;

coupling a fourth resistor between the emitter of said first transistor means and the voltage source;

coupling the collector of a fourth transistor means to the emitter of said third transistor means;

coupling the base of said third transistor means to said enable control signal; and coupling the base of said fourth transistor means to said vent control signal.

* * * * *